US007701240B2

(12) United States Patent
Flautner et al.

(10) Patent No.: US 7,701,240 B2
(45) Date of Patent: Apr. 20, 2010

(54) INTEGRATED CIRCUIT WITH ERROR CORRECTION MECHANISMS TO OFFSET NARROW TOLERANCING

(75) Inventors: Krisztian Flautner, Cambridge (GB); David Michael Bull, Balsham (GB); Todd Michael Austin, Ann Arbor, MI (US); David Theodore Blaauw, Ann Arbor, MI (US); Trevor Nigel Mudge, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 1162 days.

(21) Appl. No.: 11/301,240

(22) Filed: Dec. 13, 2005

(65) Prior Publication Data

US 2006/0200699 A1 Sep. 7, 2006

Related U.S. Application Data

(60) Provisional application No. 60/658,179, filed on Mar. 4, 2005.

(51) Int. Cl.
*G01R 31/26* (2006.01)
*G01R 31/28* (2006.01)
(52) U.S. Cl. ...................... 324/765; 714/724
(58) Field of Classification Search .................. None
See application file for complete search history.

(56) References Cited

U.S. PATENT DOCUMENTS 7,162,661 B2 * 1/2007 Mudge et al. ............... 714/746
7,278,080 B2 * 10/2007 Flautner et al. ............. 714/746
7,310,755 B2 * 12/2007 Mudge et al. ............... 714/724
7,320,091 B2 * 1/2008 Blaauw et al. .............. 714/708
7,337,356 B2 * 2/2008 Mudge et al. ............... 714/708
7,401,273 B2 * 7/2008 Lee et al. .................... 714/724
7,412,633 B2 * 8/2008 Kimelman et al. .......... 714/724
7,444,546 B2 * 10/2008 Kimelman et al. ........... 714/31
2004/0210797 A1 * 10/2004 Kimelman et al. ........... 714/25
2007/0288798 A1 * 12/2007 Flautner et al. ............. 714/30
2009/0049331 A1 * 2/2009 Blome et al. .................. 714/3

OTHER PUBLICATIONS

Austin et al., *Making Typical Silicon Matter with Razor*, Computer, published by IEEE Computer Society, Mar. 2004, pp. 41-49.
Austin et al., *Opportunities and Challenges for Better Than Worst-Case Design*, published Jan. 2005, 8 pages.

* cited by examiner

*Primary Examiner*—Jermele M Hollington
(74) *Attorney, Agent, or Firm*—Nixon & Vanderhye P.C.

(57) ABSTRACT

An integrated circuit 2 has a specified range of runtime-variable operating parameters. Data processing circuits 4 within the integrated circuit 2 have associated error detection and error repair mechanisms 6. When operating within a narrow typical-case range of runtime-variable operating parameters the data processing circuits 4 operate correctly and substantially without error. When operating outside of this typical-case range but inside the specified range of permitted values for the run-time variable operating parameters, then the error detection and error repair circuit 6 operate to repair the errors which occur.

4 Claims, 2 Drawing Sheets

INTEGRATED CIRCUIT WITH ERROR CORRECTION MECHANISMS TO OFFSET NARROW TOLERANCING

This application claims the benefit of Provisional Application Ser. No. 60/658,179 filed Mar. 4, 2005.

BACKGROUND OF THE INVENTION

1. Field of the Invention

This invention relates to the field of integrated circuits. More particularly, this invention relates to the relationship between the design tolerances of an integrated circuit and the errors which arise on integrated circuits. This application claims the benefits of Provisional Application 60/658,179 filed on Mar. 4, 2005.

2. Description of the Prior Art

A significant problem in nanometre circuit design is achieving robust operation in the face of silicon variation, various noise sensitivities, simulation uncertainties and the like. The way designers deal with such problems is by adding enough design margin on critical parameters (such as operating voltage, device width, etc) to make sure that devices continue to operate correctly in the face of even worst case corner conditions. Margining is done throughout the entire design chain, e.g. process technology designers provide rules that are sufficiently padded so that circuit designers do not need to understand all the low level detail of the process. As a result, circuit libraries are padded simply to simplify their use by chip designers. Such margining continues at all levels of the design hierarchy.

The use of design margins in this way is an important tool to help abstract the detail between the implementation layers, but it comes with a significant efficiency cost: the penalties for ensuring that a chip works under all conditions are incurred even when the operating conditions are significantly better than worst case. Worst-case corner conditions are rare, especially the concurrent occurrence of all the issues that all the different design margins address.

A previously proposed technique described in WO-A-2004/08092 and in "Making Typical Silicon Matter with Razor" by Todd Austin et al IEEE Computer Society March 2004 (referred to herein as Razor) aims to recover some of the design-time efficiency loss due to margining by, at run-time, adapting the specific operating conditions on each individual integrated circuit to find the point at which errors occur and then use the detection and correction of such errors in a feedback control of the operating parameter concerned so as to run at a finite non-zero error rate right at the edge of what is possible for that individual integrated circuit.

SUMMARY OF THE INVENTION

Viewed from one aspect the present invention provides an integrated circuit having an operating specification including a plurality of runtime-variable operating parameters with respective specified ranges of values within which said integrated circuit will operate, said integrated circuit comprising:

a plurality of data processing circuits operable to perform data processing operations;

at least one error detecting circuit coupled to one or more of said plurality of data processing circuits and operable to detect an error in a data processing operation performed by one or more of said plurality of data processing circuits; and at least one error repair circuit operable to repair said error detected by said at least one error detecting circuit; wherein for at least one runtime-variable operating parameter of said plurality of runtime-variable operating parameters, said plurality of data processing circuits are formed with a runtime-invariable tolerance in respect of said least one runtime-variable operating parameter such that:

when said at least one runtime-variable operating parameter is within a typical-case range of values, then said plurality of data processing circuits operate substantially without error; and when said at least one runtime-variable operating parameter is outside said typical-case range of values, but inside said specified range of values, then said plurality of data processing circuits operate with errors that are detected by said at least one error detecting circuit and repaired by said at least one error repair circuit.

The present technique goes further than Razor in that it allows designers of the different layers of the implementation hierarchy to design aiming for the typical case of operation for the integrated circuit (a much narrower range of operating conditions) and deal with the unlikely combinations of corner cases through on-chip error detection and error repair (error recovery) mechanisms. When such a technique is deployed on an entire integrated circuit, then substantially all the on-chip structures processors, interconnect, hardware accelerators, etc) should have coordinated assumptions about the nature and likelihood of errors and their detection and repair. This in turn depends upon what rules have been relaxed and on assumptions about what constitutes the most likely operating scenario.

Thus, an integrated circuit can have a specified range for its runtime-variable operating parameters (e.g. a specified temperature range of operation) that is quite wide and within that broader range will be found a typical-case range which is much narrower, e.g. the specified range might be $-10°$ C. to $70°$ C. and the typical-case range might be $20°$ C. to $25°$ C. The integrated circuit will operate substantially without errors when inside the typical case range, but will rely upon the error detection and error repair mechanism(s) when outside of the typical case range but inside the specified range for the integrated circuit. There are penalties to be paid in power or performance terms for relying upon the error detection and error repair mechanisms, but these penalties are more than offset by the advantages which can be gained by relaxing the tolerances which must be provided in all the various levels and layers of the integrated circuit as a whole. In practice, the integrated circuit will spend an overwhelming majority of its time operating in the typical-case range and will only occasionally operate outside of this range. Thus, the advantages of relaxing the design tolerances for the processing circuits will be realised for most of the time with the price in terms of error detection and error recovery being relatively minor.

It will be appreciated that the runtime-variable operating parameters (outside the designer's control) which vary can take a variety of different forms. However, the present technique is particularly useful with respect to runtime-invariable tolerances (as chosen by the designer) associated with runtime-variable operating parameters in one or more of: operating temperature, power supply voltage, clock frequency, electromagnetic noise, data values and body bias voltage.

The characteristics of the processing circuits (or integrated circuit as a whole) which can be less restrictively provided when the tolerances required to cope with the runtime-variable operating parameters are relaxed due to the presence of error detection and error recovery mechanisms can vary, but particular advantages relate to these characteristics being one or more of the physical size of the data processing circuits, the spacing between the data processing circuits manufacturing variations in size of the data processing circuits, temperature tolerance range, permitted IR drop, parametric yield requirements, MTBF of permanent or single event upsets. The tolerances which are normally built into integrated circuit designs in respect of such parameters bring with them significant costs in terms of cost, efficiency, speed, power consumption and the like which can be addressed, at least to some extent, by the present technique.

Viewed from another aspect the present invention provides a method of designing an integrated circuit, said method comprising the steps of:

specifying one or more functional blocks to be formed on said integrated circuit, each of said functional blocks having an operating specification including a plurality of runtime-variable operating parameters with respective specified ranges of values within which said functional block can operate and typical-case ranges of values within which said functional block will operate substantially without error;

selecting respective implementations of said one or more functional blocks with which to form said data processing circuits, said one or more functional blocks specified and said implementations selected together resulting in one or more run-time invariable tolerances in respect of said runtime-variable operating parameters;

adding to said integrated circuit at least one error detection circuit coupled to said one or more of said plurality of data processing circuits to detect an error in a data processing operation performed by said one or more of said pluraltiy of data processing circuits;

adding to said integrated circuit at least one error repair circuit to repair said error detected by said at least one error detection circuit; and iterating numbers and placement of said at least one error detection circuit and said at least one error repair circuit with associated simulated operation of said integrated circuit until substantially all errors which occur due to said one or more run-time invariable tolerances when operating outside one or more of said typical-case ranges and inside said specified ranges are detected and repaired.

The above, and other objects, features and advantages of this invention will be apparent from the following detailed description of illustrative embodiments, which is to be read in connection with the accompanying drawings.

DESCRIPTION OF THE PREFERRED EMBODIMENTS

Figure 1:
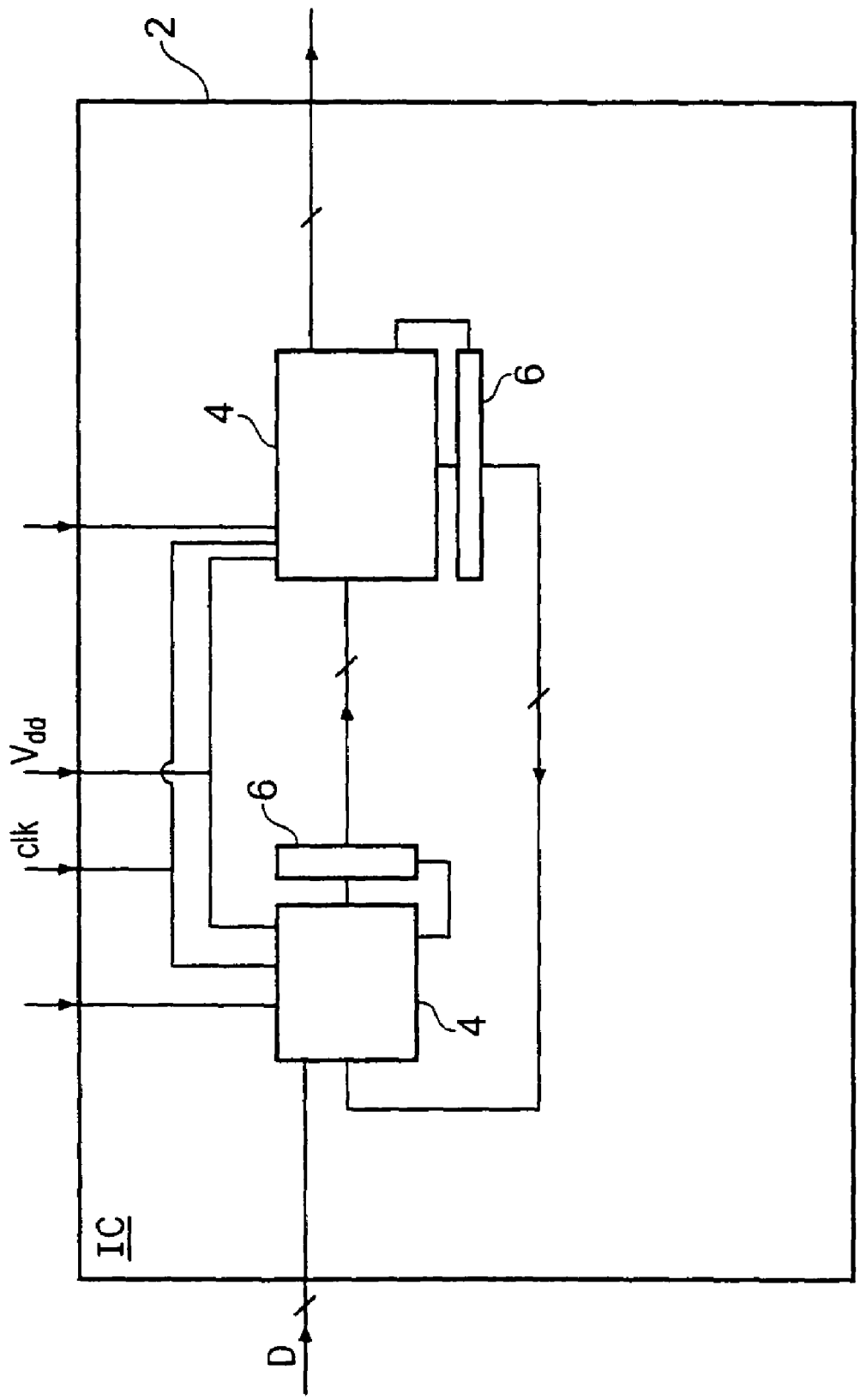
FIG. 1 schematically illustrates an integrated circuit according to the present technique.

FIG. 1 schematically illustrates an integrated circuit 2 including a plurality of data processing circuits 4 each with an associated error detection and error repair circuit 6. The data processing circuits 4 can take a wide variety of different forms but typically process data values D and operate using a integrated circuit supply voltage $V_{dd}$, an associated body bias voltage and a clock signal clk having a predetermined clock frequency. The data processing circuits 4 will be formed of a large number of discrete components such as transistors, resistors, multiplexers and other circuit primitives each having an associated physical size for its various semi-conductor layers. It is generally desirable to reduce the physical size of these individual components so that more components can be formed on a single integrated circuit. The integrated circuit can then operate faster, can generate less heat, and be improved in various other respects. However, when the physical size gets smaller the sensitivity of the data processing circuits to operate in parameters such as the supply voltage $V_{dd}$, the clock frequency, variations in size due to manufacturing process variation, etc also increase. For this reason, it becomes increasingly difficult to reduce the physical size of the circuit elements within an integrated circuit without increasing the error rate (single event and/or permanent MTBF) to an unacceptable level. The physical separation of the data processing circuits 4 within the integrated circuit may also be a constraining factor with communication over relatively large distances across the integrated circuit being a design constraint. Other design constraints which may be relaxed include temperature tolerance, power consumption, IR drop, parametric yield and the like.

The error detecting and error repair circuits 6 associated with the data processing circuits 4 can take a wide variety of different forms. Typical examples of such error detection and error repair circuits are described in the previously mentioned patent WO-A-2004/084072 and are known herein as Razor techniques. Alternative error detection and error repair techniques are also possible. A characteristic of such error detection and error repair circuits 6 in this context is that they are relatively infrequently used and accordingly the penalty associated with their use is more than offset by the performance advantages that can be gained by relaxing the design tolerances for the data processing circuits 4 and using the error detection and error repair circuit 6 to repair the errors which are thus introduced.

Figure 2:
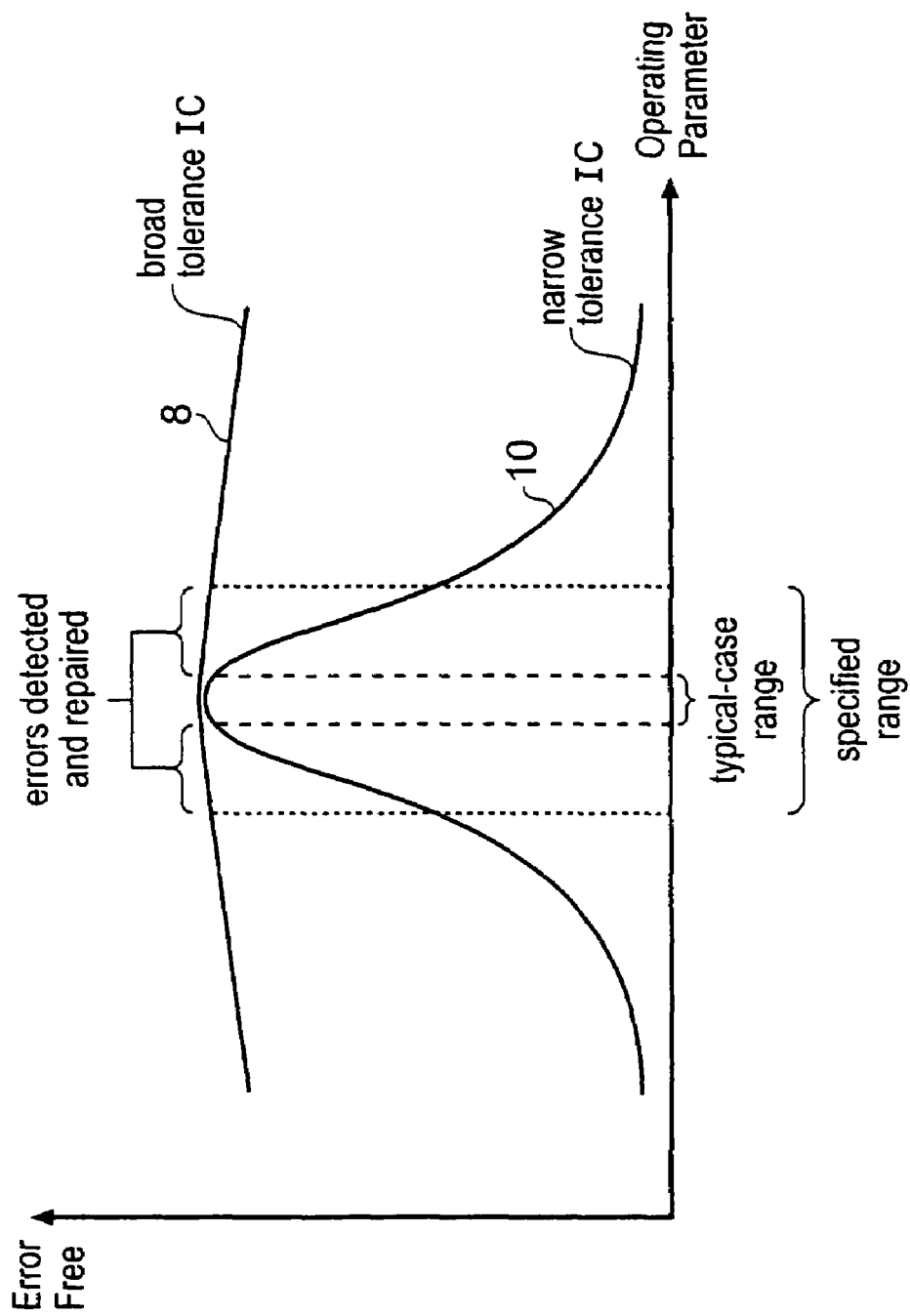
FIG. 2 schematically illustrates the variation in error rate with runtime-variable operating parameter for a narrow tolerance integrated circuit in accordance with the present technique compared to a traditional broad tolerance integrated circuit.

FIG. 2 schematically illustrates a variation of error rate with an operating parameter, such as temperature, operating voltage, clock speed or a variety of other parameters. The variation with a broad tolerance integrated circuit of the prior art technique is shown in curve 8. This shows that throughout the specified range of operation of this broad tolerance integrated circuit, the proportion of integrated circuits that operate error free remains sufficiently high to be acceptable. This is achieved at the cost of having to use broad tolerances and wide design margins throughout the integrated circuits at its various levels of abstraction.

The curve 10 in FIG. 2 illustrates the situation for a narrow tolerance integrated circuit relying on the present techniques. This curve illustrates that whilst the integrated circuit is operating within the typical case range of the runtime-variable operating parameter, the error free proportion remains high and operation is substantially without error and accordingly does not incur the error detection and error repair penalties, such as processing delay, extra energy consumption and the like. However, when temporarily outside of this typical case range, as may occur due a temporary variation in the supply voltage, a particular corner case data value being processed, or other reasons individually or in combination, the error free proportion falls significantly, but correct operation is ensured by the action of the error detection and error repair circuit 6. Thus, the narrow tolerance integrated circuit is able to have the same specified overall range of operating parameters within which it can function. However, it functions when outside of the typical case range by reliance upon the error detection and error repair circuit(s) 6. Nevertheless, the overall improvements in performance with such integrated circuits make this technique worthwhile.

Typical-case design means that a system has as its design aiming point the most common operating conditions, but there is a still a requirement that the system works when faced with worst-case conditions (i.e. within the specified range which is larger than the typical case range). This can be accomplished if the violations of the typical-case assumptions are detected and recovered outside of the critical path of operation (having error detection and recovery on the critical path would be just another form of worst-case margining). A good example of such a technique can be seen in the above described Razor approach, where the Razor flip-flop detects timing violations and after the value has already been forwarded and used by subsequent operating stages. Leaving the opportunity for operating with results that downstream may turn out to be incorrect necessitates a high-level co-ordination between micro-architectural and IP blocks and the addition of logic to deal with detection and recovery. The underlying assumptions about the detection and recovery (what and how can be recovered) are referred to as the meta-architecture.

Depending upon what conditions are relaxed, different recovery schemes are appropriate. The initial Razor technique was designed to be able to tolerate variations in timing due to voltage scaling. Timing error detection in the linear region of voltage scaling can be accomplished with low overhead, on the order of a single cycle and the correct value can usually be easily inferred. Adding tolerance for single event upsets would leave the detection intact, but would place more burden on the recovery as data may need to be re-computed. However, in some designs, the speed of detection may be significantly longer (e.g. due to micro-architectural issues), in which case the recovery technique should be able to deal with a later connect point.

Constraints can be relaxed at multiple layers of the implementation hierarchy. For example, circuits could be designed with little regard to coupling on interconnects and memories could return a possibly incorrect result quickly and have the freedom to return the correct value sometime later. At the micro-architectural level, structures could be designed for fast operation on the expected range of values at the expense of slower operation on unexpected data.

Designing for the typical case requires that cell libraries and their associated design rules are changed so that they need only be guarantee to operate correctly in the typical case and with some level of confidence outside of that. A new factor is the need to define the range of operation that constitutes typical case. There are two competing forces. On the one hand it is desirable that the typical case saves significantly over the worst case in terms of area, speed and power. On the other hand these improvements should not come at the expense of having to correct too frequently for the worst case events.

Typical case design still mostly follows a conventional design flow with one significant exception the need to include error recovery It is desirable to use design tools to automatically insert the needed error recovery mechanisms using hooks provided by the meta-architecture (i.e. the circuit designers recognise the points at which error detection and error recovery can be conveniently made).

Getting all the on-chip components to operate together when trying to design a system targeted at the typical case requires coordination between factors such as the various frequency and power domains and coordinated assumptions about the relaxation of design parameters and what the recovery logic can handle.

A typical design scenario would be the following:

The chip designer starts with the specification of components that need to be put on-chip. The meta-architectural assumptions of each component and the interconnect determines what design rules can be relaxed and what range of conditions need to be covered for the typical case.

Give the meta-architectural constraints, the chip designer chooses a set of implementations for the components, e.g. cell libraries and memories that fit the constraints of all the components (at another level the implementation selection may be, for example, use of a particular adder design depending upon the conditions). This may mean that in the end there is a single library which is used on-chip for all the components or that multiple domains with different libraries are defined. The interconnect between these domains needs to provide the necessary bridging between the different meta-architectures.

The use of multiple cell libraries and memories may necessitate the use of a multitude of operating voltages and clock frequencies, thus finding the correct trade off is a system design exploration task. Cell libraries also need to have a concept of "error bars" which specify in what way the cell implementations can fail under worst-than-typical case conditions (e.g. linear or exponential slow down, bit flips, ... ).

Once the appropriate components and cell libraries have been selected, the system still needs to be stitched together so that the error detection and correction work in a coordinated and consistent way. This is best done through the use of automation, which deploys the appropriate error detection network and recovery logic through the use of meta-architectural hooks in the IP components and interconnects. At this point, it is possible for the tool not to be able to reach "recovery-closure" and this would force the designer to select different said libraries and/or IP blocks. Note that the correctness speculation can extend across multiple chips, but is most likely that off-chip accesses will need to be stable before they can reach a chip boundary.

The notion of "error bars" mentioned above is significant. In worst-case design each component, for example a library cell, is designed to work correctly under all operating conditions. Thus, composing a system from a collection of cells will also work correctly. In typical case design the cells themselves are not required to work correctly when certain unlikely combinations of corner cases occur—a recovery mechanism provides protection. However, it is desirable that the errors resulting from these unlikely combinations of corner cases do not accummulate when many cells are combined into a system. In many cases the errors do not in fact accummulate. For example, consider a library cell that is designed to work below 25° C. at a certain frequency, and further that exceeding this temperature occurs only 0.01% of the time. When this corner occurs we can say that the cell "fails" in some sense. Building a system of two such cells will not fail 0.02% of the time, because the events do not add.

Typical case design thus needs to take account of the way in which corner cases distribute when individual cells are combined in order to know where recovery mechanisms need to be inserted, and of what type they need to be.

To summarise, typical-case design centres around the close interplay and trade-offs between the following areas:

Cell library/memory assumptions. Timing assumptions, noise sensitivity. Two phase memory access protocol: likely-correct value quickly, correct results later.

Micro-architectural timing requirements and connect points. How much specification is allowed, when is the latest that correctness decisions need to be made. Micro-architectures optimised for typical-case latencies influence these factors.

Error Detection. The type of error (linear or exponential timing errors, single even upsets, etc). The time needed and/or allowed for error detection.

Error Recovery. The amount of state that can be recovered. The nature of recovery, timing violation versus state corruption.

A way to think about typical case design is that the system is designed for typical operating conditions and errors are recovered on demand. The integrated circuit has a specified operating range greater than the typical case range and error detection and recovery mechanisms deal with the limited amount of time the integrated circuit spends operating outside of the typical case range.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit having an operating specification including a plurality of runtime-variable operating parameters with respective specified ranges of values within which said integrated circuit will operate, said integrated circuit comprising:

a plurality of data processing circuits operable to perform data processing operations;

at least one error detecting circuit coupled to one or more of said plurality of data processing circuits and operable to detect an error in a data processing operation performed by one or more of said plurality of data processing circuits; and at least one error repair circuit operable to repair said error detected by said at least one error detecting circuit; wherein for at least one runtime-variable operating parameter of said plurality of runtime-variable operating parameters, said plurality of data processing circuits are formed with a runtime-invariable tolerance in respect of said least one runtime-variable operating parameter such that:

when said at least one runtime-variable operating parameter is within a typical-case range of values, then said plurality of data processing circuits operate substantially without error; and when said at least one runtime-variable operating parameter is outside said typical-case range of values, but inside said specified range of values, then said plurality of data processing circuits operate with errors that are detected by said at least one error detecting circuit and repaired by said at least one error repair circuit.

2. An integrated circuit as claimed in claim 1, wherein said at least one runtime variable operating parameter is one or more of:

(i) operating temperature of said integrated circuit;
(ii) power supply voltage for said integrated circuit;
(iii) clock frequency for said integrated circuit;
(iv) electromagnetic noise surrounding said integrated circuit;
(v) data values being processed by said integrated circuit; and
(vi) body bias voltage of said integrated circuit.

3. An integrated circuit as claimed in claim 1, wherein said plurality of data processing circuits are formed with at least one characteristic limiting said runtime-invariable tolerance to said at least one operating parameter, said at least one characteristic including one or more of:

(i) a physical size of said plurality of data processing circuits;
(ii) a spacing between said plurality of data processing circuits;
(iii) manufacturing variations in size of said plurality of data processing circuits;
(iv) power consumption of said plurality of data processing circuits;
(v) temperature range tolerance of said plurality of data processing circuits;
(vi) IR drop within said plurality of data processing circuit;
(vii) parametric yield requirements for said integrated circuit;
(viii) mean time to permanent failure for said integrated circuit; and
(ix) mean time to signal event failure for said integrated circuit.

4. A method of designing an integrated circuit, said method comprising the steps of:

specifying one or more functional blocks to be formed on said integrated circuit, each of said functional blocks having an operating specification including a plurality of runtime-variable operating parameters with respective specified ranges of values within which said functional block can operate and typical-case ranges of values within which said functional block will operate substantially without error;

selecting respective implementations of said one or more functional blocks with which to form said data processing circuits, said one or more functional blocks specified and said implementations selected together resulting in one or more run-time invariable tolerances in respect of said runtime-variable operating parameters;

adding to said integrated circuit at least one error detection circuit coupled to said one or more of said plurality of data processing circuits to detect an error in a data processing operation performed by said one or more of said pluraltiy of data processing circuits;

adding to said integrated circuit at least one error repair circuit to repair said error detected by said at least one error detection circuit; and iterating numbers and placement of said at least one error detection circuit and said at least one error repair circuit with associated simulated operation of said integrated circuit until substantially all errors which occur due to said one or more run-time invariable tolerances when operating outside one or more of said typical-case ranges and inside said specified ranges are detected and repaired.

* * * * *